United States Patent
Amano (10) Patent No.: US 8,265,721 B2
(45) Date of Patent: Sep. 11, 2012

(54) BIASING APPARATUS

(75) Inventor: Masayuki Amano, Kanagawa (JP)

(73) Assignee: Nokia Corporation, Espoo (FI)

( * ) Notice: Subject to any disclaimer, the term of this patent is extended or adjusted under 35 U.S.C. 154(b) by 849 days.

(21) Appl. No.: 12/316,603

(22) Filed: Dec. 15, 2008

(65) Prior Publication Data

US 2010/0151924 A1 Jun. 17, 2010

(51) Int. Cl.
*H04M 1/00* (2006.01)
(52) U.S. Cl. ............... 455/575.4; 455/575.1; 455/575.3; 455/575.8; 379/433.11; 379/433.12; 379/433.13
(58) Field of Classification Search .... 455/575.1–575.8; 379/428.01, 433.01, 433.11–433.13
See application file for complete search history.

(56) References Cited

U.S. PATENT DOCUMENTS

| 7,239,897 | B2 * | 7/2007 | Ozaki | 455/575.1 |
| 7,252,511 | B2 * | 8/2007 | Santos et al. | 439/10 |
| 7,783,331 | B2 * | 8/2010 | Chung et al. | 455/575.1 |
| 2009/0029748 | A1 * | 1/2009 | Lee | 455/575.4 |
| 2009/0049646 | A1 * | 2/2009 | Rubin et al. | 16/319 |
| 2010/0113110 | A1 * | 5/2010 | Lee | 455/575.4 |

* cited by examiner

*Primary Examiner* — Lester Kincaid
*Assistant Examiner* — Mehmood B Khan
(74) *Attorney, Agent, or Firm* — Harrington & Smith (57) ABSTRACT

An apparatus including a first housing; a second housing slidably connected to the first housing along a substantially straight linear path between a first position and a second position; and a biasing system configured to alternatively bias the second housing towards the first position and the second position. The biasing system includes a linkage connected to the first and second housings and a spring connected between the first housing and the linkage.

18 Claims, 6 Drawing Sheets

BIASING APPARATUS

BACKGROUND OF THE INVENTION

1. Field of the Invention

The invention relates to a system and method regarding biasing two members relative to each other and, more particularly, to a biasing system configured to bias a member in two different directions.

2. Brief Description of Prior Developments

Spring assisted slide phones are known in the art. If the spring assist technology used in those phones is applied to a landscape slide mechanism without any specification changes, mechanism elements, mainly springs, would be visible when the product is opened. This would be unsightly and perhaps be prone to damage.

SUMMARY

The following summary is merely intended to be exemplary. The summary is not intended to limit the scope of the claimed invention.

In accordance with one aspect of the invention, an apparatus is provided including a first housing; a second housing slidably connected to the first housing along a substantially straight linear path between a first position and a second position; and a biasing system configured to alternatively bias the second housing towards the first position and the second position. The biasing system includes a linkage connected to the first and second housings and a spring connected between the first housing and the linkage.

In accordance with another aspect of the invention, an apparatus is provided comprising a first housing; a second housing slidably connected to the first housing along a linear path between a first position and a second position; and a biasing system comprising a linkage arm and a spring. The linkage arm comprises a first end pivotably connected to the first housing at a pivotal connection and a second end slidably connected to the second housing. The spring comprises a first end connected to the first housing and a second end connected to the linkage arm. The first end of the spring is spaced from the pivotal connection of the first end of the linkage arm with the first housing. The biasing system is configured to bias the second housing towards the first position and alternatively toward the second position.

In accordance with another aspect of the invention, a method is provided comprising slidably connecting a first housing with a second housing; and connecting a biasing system to the first and second housings. The biasing system is configured to bias the second housing towards a first position relative to the first housing and alternatively towards a second position relative to the first housing. The biasing system comprises a linkage between the first and second housings and a spring connected between the first housing and the linkage. The linkage comprises a first end pivotably connected to the first housing at a pivotal connection and a second end slidably connected to the second housing. The spring comprises a first end connected to the first housing and a second end connected to the linkage arm. The first end of the spring is spaced from the pivotal connection of the first end of the linkage arm with the first housing.

BRIEF DESCRIPTION OF THE DRAWINGS

The foregoing aspects and other features of the invention are explained in the following description, taken in connection with the accompanying drawings, wherein.

DETAILED DESCRIPTION OF EMBODIMENTS

Figure 1:
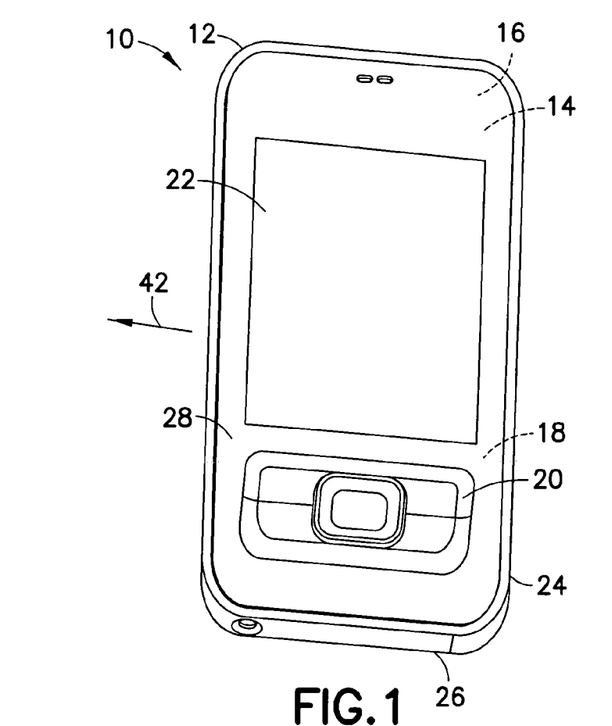
FIG. 1 is a perspective view of a portable hand-held electronic device comprising features of the invention in a closed position.

Referring to FIG. 1, there is shown a perspective view of an electronic device 10 incorporating features of the invention. Although the invention will be described with reference to the example embodiments shown in the drawings, it should be understood that the invention can be embodied in many alternate forms of embodiments. In addition, any suitable size, shape or type of elements or materials could be used.

In this example embodiment the device 10 is a multifunction portable electronic device. However, in alternate embodiments, features of the exemplary embodiment of this invention could be used in any suitable type of hand-held portable electronic device such as a mobile phone, a gaming device, a music player, or a PDA, for example. In addition, as is known in the art, the device 10 can include multiple features or applications such as a camera, a music player, a game player, or an Internet browser, for example. The device 10 generally comprises a housing 12, a transceiver 14 connected to an antenna 16, electronic circuitry 18, such as a controller and a memory example, within the housing 12, a user input region 20 and a display 22. The display 22 could also form a user input section, such as a touch screen. The housing 12 includes a first housing section 24 and a second housing section 26. It should be noted that in alternate embodiments, more than two housing sections could be provided. Additionally, in alternate embodiments, the device 10 can have any suitable type of features as known in the art.

Figure 2:
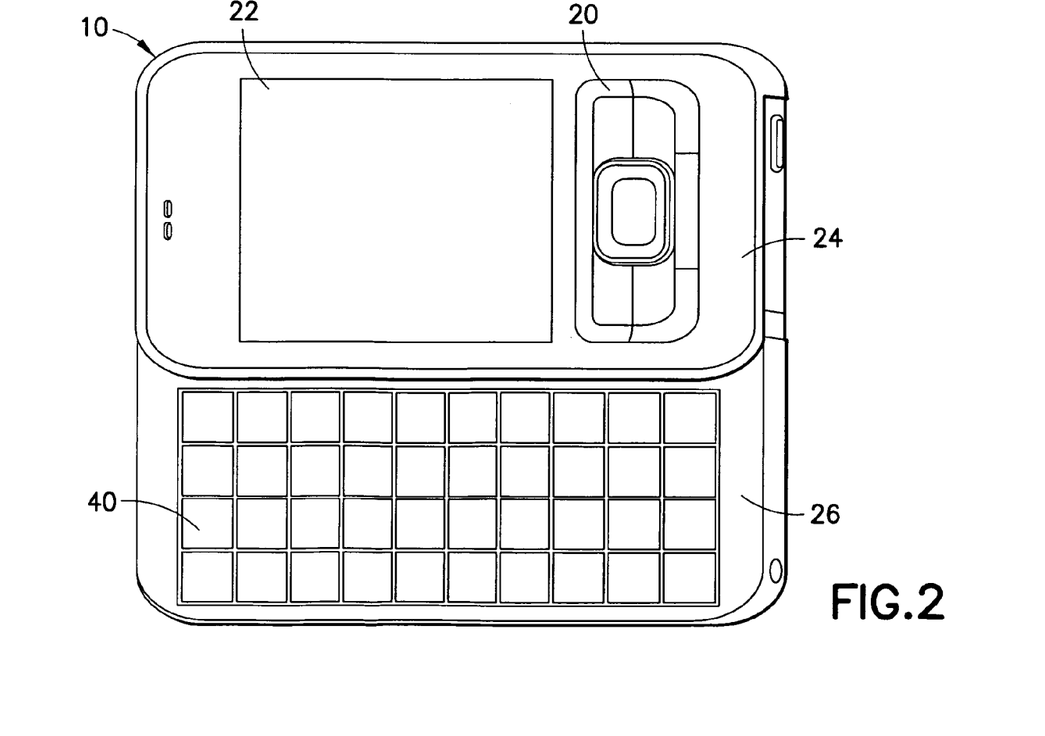
FIG. 2 is a perspective view of the device shown in FIG. 1 is an open position.

The second housing section 26 is movably connected to the first housing section 24. More specifically, the second housing section 26 is slidably connected to the first housing section 24 between a closed position as shown in FIG. 1, and an open position as shown in FIG. 2. The device 10 may comprise a mechanism for telescoping or longitudinal type of sliding motion between the first housing section 24 and the second housing section 26. However, any suitable type of sliding motion may be provided.

The first housing section 24 forms a front face 28 and a back face of the electronic device 10 (and the housing 12). In this embodiment, the first housing section 24 comprises the first user input region 20 and the display 22 at the front face 28. The first user input region 20 may be any suitable type of user input region.

The second housing section 26 forms a majority of the back face of the electronic device 10 (and the housing 12) when the second housing section 26 is in the closed position. Additionally, the second housing section 26 forms portions of the back face of the electronic device 10 (and the housing 12) when the second housing section 26 is in the open position. More specifically, in this embodiment the second housing section 26 forms about half of the portions of the back face of the electronic device 10 (and the housing 12) when the second housing section 26 is in the open position.

The second housing section 26 comprises a second user input region 40. The second user input region 40 may be a keyboard or a keypad, for example. However, it should be noted that alternate embodiments may provide any suitable type of user input region. The second user input region 40 is visible and accessible when the device 10 is in the open position shown in FIG. 2.

It is to be noted that although the figures illustrate the first housing section 24 comprising the first user input region 20 and the display 22 and the second housing section 26 comprising the second user input region 40, alternate embodiments may comprise any suitable location for the user input regions and display. Additionally, more than one user input region and/or display may be provided. The second housing section 26 is movably connected to the first housing section 24 such that from the closed position the second housing section 26 is configured to slide in a direction 42 away from an elongate side of the device 10. In an alternate embodiment the second housing section 26 could slide out from the opposite elongate side of the first housing section 24. The sliding motion is downward (or upwards) in a landscape profile or laterally sideways in a portrait profile; rather than downward (or upwards) in the portrait profile. Thus, the second housing section 26 slides out from one of the longer sides of the first housing section 24.

The slidable connection (or the integrated slide connection) between the first housing section 24 and the second housing section 26 acts as a moving (or slidable) tube, which forms a base for the second user input region (keypad, touch pad etc.) 40, and forms a partial outer cover for the back face of the device 10. When in the closed position, the second housing section 26 comprises an interior volume which is used as a space for hardware components, a battery, audio components, and/or an interior cavity, for example. When the second housing section 26 is slid into the open position, the interior volume (or hollow space) may also create a natural route for the electrical connection (which may be a tex flex, flat flexible cable (FFC), flexible printed circuit (FFC) cable, or any suitable cable/conductor for example) for the second user input region 40 and other possible electrical components moving with the second housing section 26. However, it should be noted that the electrical interconnection between the first housing section 24 and the second housing section 26 may be made by any suitable means.

The interior volume is between a front portion and a back portion of the second housing section 26. When the second housing section 26 is in the closed position, a component housing portion of the first housing section 24 can be located within the interior volume. When the second housing section 26 is moved to the open position, the front portion and the back portion of the second housing section 26 slide (in the direction 42) over the component housing portion of the first housing section 24. This moves the interior volume away from the component housing portion, and provides an open volume (substantially free of electronic components of the component housing portion and/or the device 10) within the interior volume. To return the second housing section 26 to the closed position, the second housing section 26 is moved towards the first side 30 of the device 10 (a direction opposite to the direction 42). As the second housing section 26 is returned to the closed position, the front portion and the back portion slide over the component housing portion such that the component housing portion is housed within the interior volume of the second housing section 26.

Figure 3:
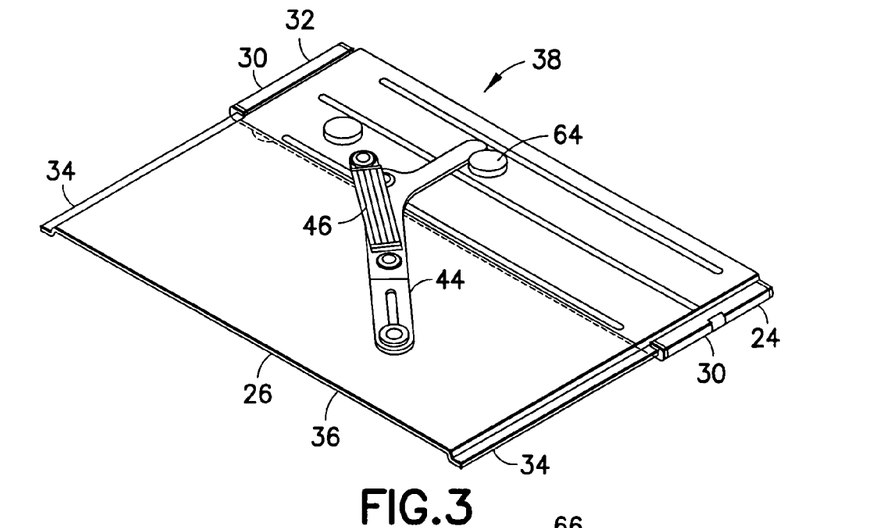
FIG. 3 is a perspective view of portions of the device shown in FIG. 1 in the closed position.
Figure 4:
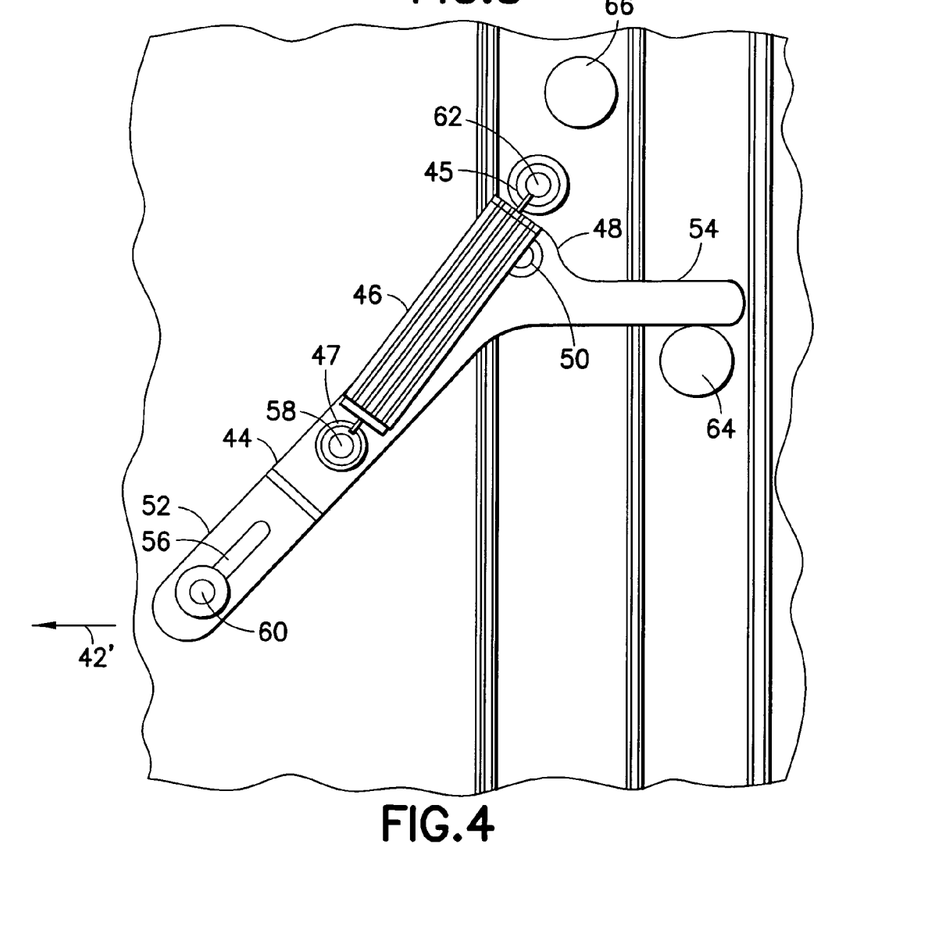
FIG. 4 is a plan view of the portions of the device shown in FIG. 3.

Referring also to FIGS. 3 and 4, the second housing section 26 is shown at its closed position relative to the first housing section 24; corresponding to FIG. 1. The slide mechanism between the first and second housing sections 24, 26 includes guide rail areas 30 on a portion 32 the first housing section 24 and mating rail areas 34 on a portion 36 of the second housing section 26. The device 10 includes a system 38 for biasing the second housing section 26 relative to the first housing section 24 at either the closed position shown in FIG. 1 or at the open position shown in FIG. 2.

The biasing system 38 generally comprises a linkage 44 and a spring 46. In this embodiment the linkage 44 comprises a single one-piece member or linkage arm. However, in alternate embodiments the linkage could comprise more than one member. The linkage arm 44 has a middle section 48 which is pivotably connected to the first housing section 24 by a pivotal connection 50. The linkage arm 44 has two arm sections 52, 54 which extend from the middle section 48 at an obtuse angle relative to each other. The first arm 52 has a longitudinal slot 56 proximate its outer end, and a spring mounting area 58. A portion 60 of the second housing section 26 is located in the slot 56.

The spring 46 is a tension spring. A first end 45 of the spring 46 is connected to a portion of the first housing section 24 at a mounting location 62. The opposite second end 47 of the spring is connected to the mounting area 58 on the linkage arm 44. The spring 46 and the linkage arm 44 have different pivot points on the first housing section 24; the pivotal connection 50 and the mounting location 62. The mounting location 62 is offset from the pivotal connection 50. Thus, in the closed position the spring 46 biases the outer end of the first arm section 52 in direction 42' (reverse to direction 42); towards the closed position. Because the portion 60 of the second housing section 26 is in the slot 56, the first arm section 52 thus biases the second housing section 26 towards its closed position.

The second arm section 54 of the linkage arm 44 is provided to function as part of a travel stop for the linkage arm; to limit rotation of the linkage arm 44 on the first housing section 24. In an alternate embodiment the second arm section 54 might not be provided; such as if an alternative travel limiting system is provided for example. The first housing section 24 includes two stops 64, 66. When the second housing section 26 is in its closed position shown in FIGS. 1 and 3-4, the second arm section 54 of the linkage arm 44 contacts the first stop 64. This stops rotation of the linkage arm 44 at the position shown in FIGS. 3 and 4; when the second housing section 26 is fully retracted.

Figure 5:
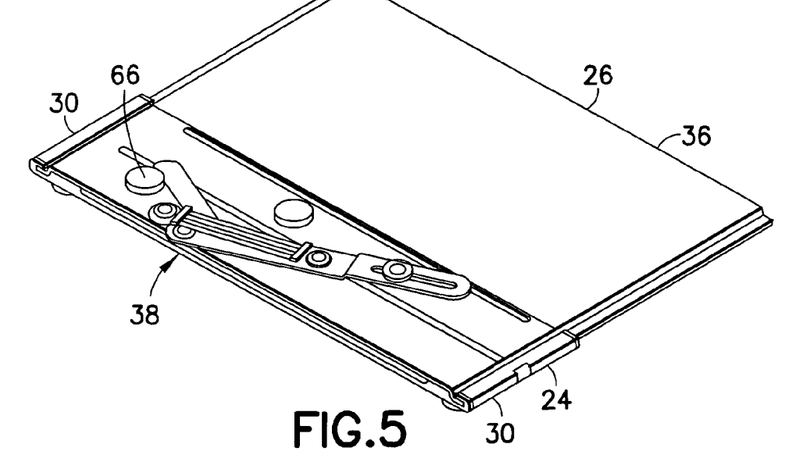
FIG. 5 is a perspective view of portions of the device shown in FIG. 2 in the open position.
Figure 6:
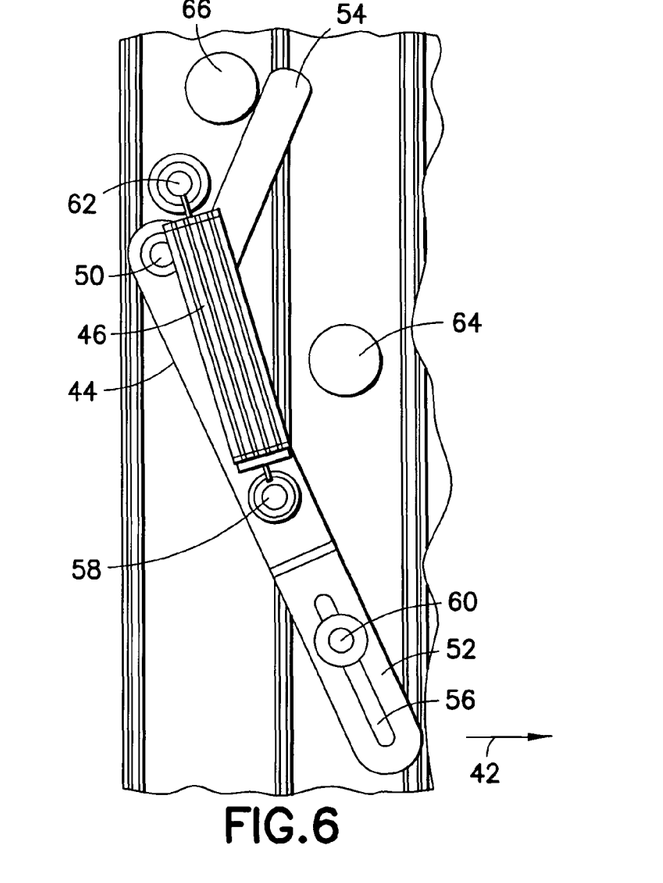
FIG. 6 is a plan view of the portions of the device shown in FIG. 4.

Referring also to FIGS. 5-6, the second housing section 26 is shown at its open position relative to the first housing section 24; corresponding to FIG. 2. In the open position the spring 46 biases the outer end of the first arm section 52 in direction 42 (reverse to direction 42'); towards the open position. Because the portion 60 of the second housing section 26 is in the slot 56, the first arm section 52 thus biases the second housing section 26 towards its open position. When the second housing section 26 is in its open position shown in FIGS.

2 and 5-6, the second arm section 54 of the linkage arm 44 contacts the second stop 66. This stops rotation of the linkage arm 44 at the position shown in FIGS. 5 and 6 when the second housing section 26 is fully extended.

Figure 7:
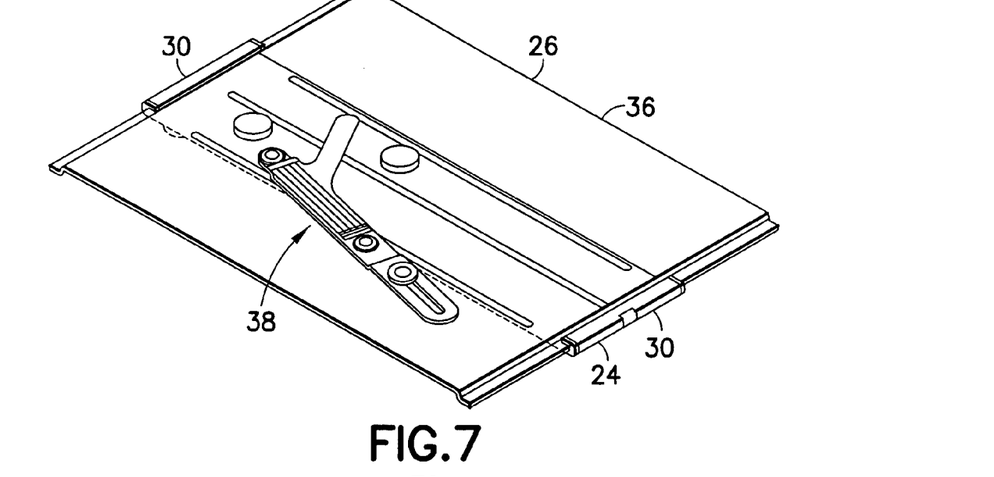
FIG. 7 is a perspective view of portions of the device as shown in FIGS. 3 and 5 in a neutral position.
Figure 8:
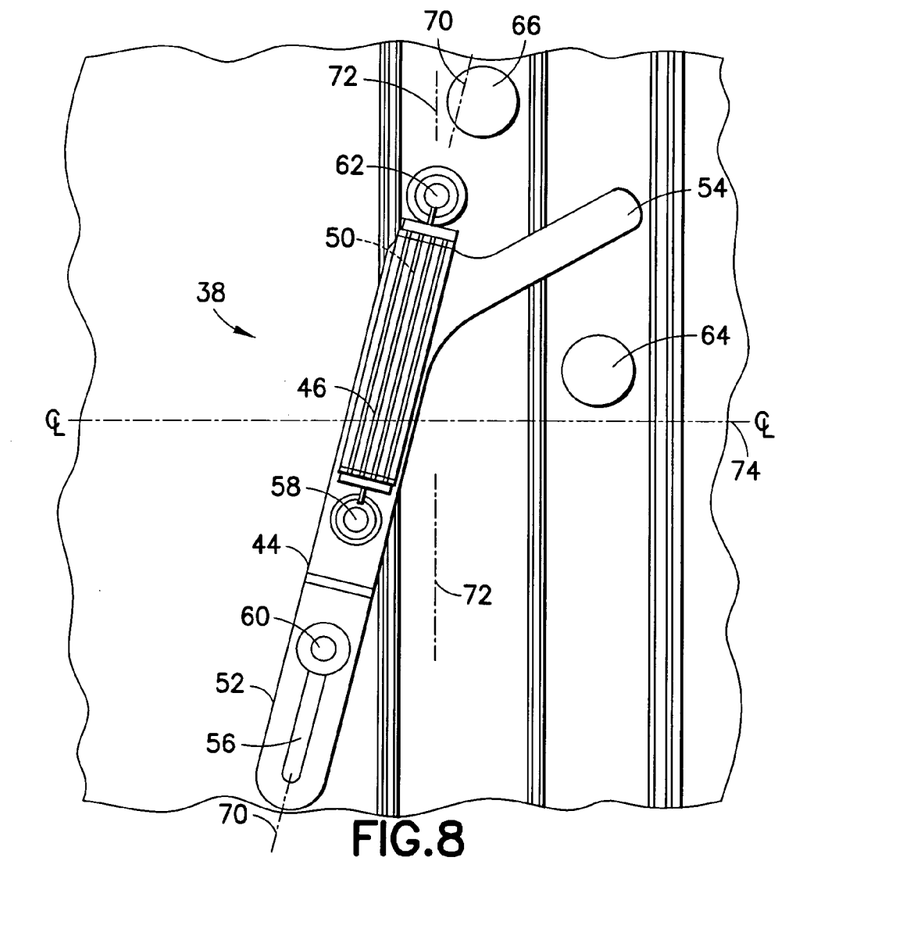
FIG. 8 is a plan view of the portions of the device shown in FIG. 7.

Referring also to FIGS. 7 and 8, the biasing system 38 is shown at its neutral or buckling position; where the spring 46 does not biases the linkage arm 44 in either direction 42 or 42'. The spring 46 is in its most extended point at this position. A line between the pivot connections 50 and 60 is located in line with the line of the spring 46 between the spring connection locations 58, 62. The spring 46 has maximum tension force at this location. In the embodiment shown, this can be provided at the half-way position of the second housing section 26 between the closed position shown in FIGS. 1 and 3-4, and the open position shown in FIGS. 2 and 5-6. Thus, a 50:50 buckling ratio can be provided with the present invention. The buckling point is on line 70 which is angled relative to the longitudinal axis 74 of the travel path of the second housing section 26, and angled relative to an axis 72 perpendicular to the longitudinal axis 74 of the path. Thus, an offset buckling point can be provided at least partially along the sliding direction. In one embodiment, up to a 30 mm stroke of the second housing section 26 relative to the first housing section 24 can be provided with a 16.5 mm guide rail length of the guide rails 30. Alternatively, any other suitable ratios and distances could be provided.

Figure 9:
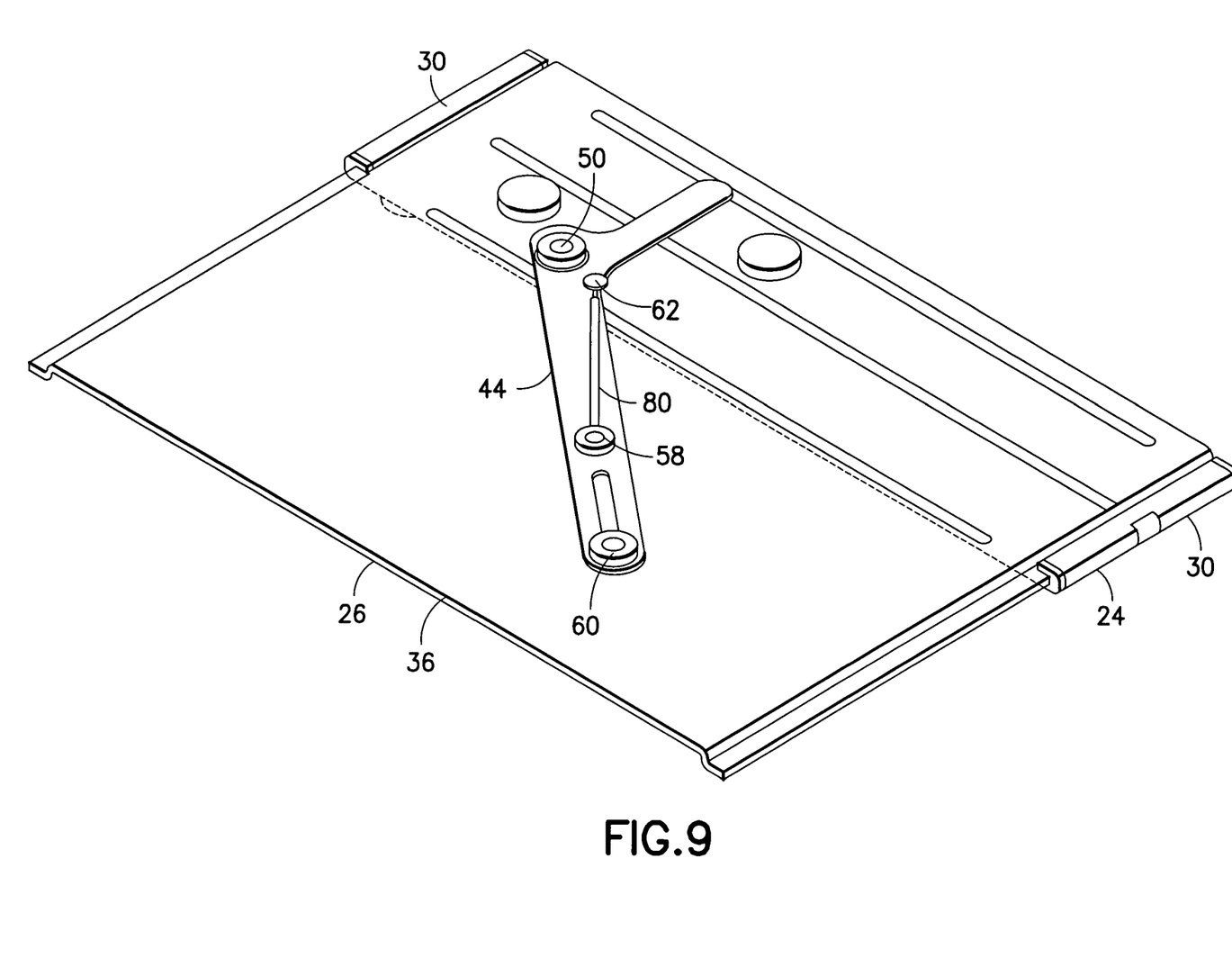
FIG. 9 is a perspective view similar to FIGS. 3, 5 and 7 of an alternate embodiment of the invention.

Referring now also to FIG. 9, an alternate embodiment is shown. In this embodiment a compression spring 80 rather than a tension spring is used. The compression spring can be used by swapping pivot point locations (50, 62) versus the first embodiment.

Figure 10:
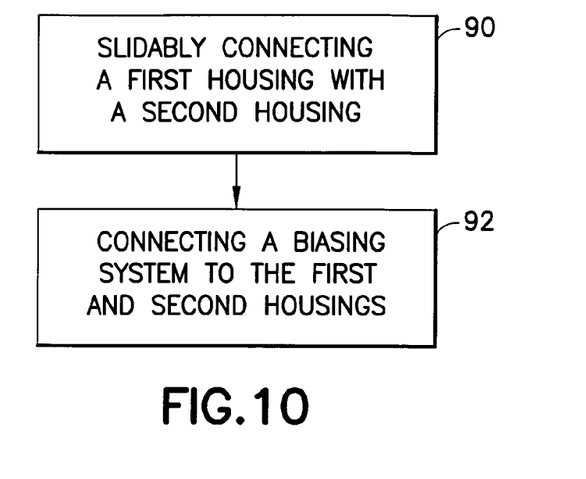
FIG. 10 is a diagram illustrating one method of the invention.

Referring also to FIG. 10 one method of the invention can comprise slidably connecting a first housing with a second housing as indicated by block 90; and connecting 92 a biasing system to the first and second housings, wherein the biasing system is configured to bias the second housing towards a first position relative to the first housing and alternatively towards a second position relative to the first housing. The biasing system can comprise a linkage between the first and second housings and a spring connected between the first housing and the linkage, wherein the linkage comprises a first end pivotably connected to the first housing at a pivotal connection and a second end slidably connected to the second housing, wherein the spring comprises a first end connected to the first housing and a second end connected to the linkage arm, wherein the first end of the spring is spaced from the pivotal connection of the first end of the linkage arm with the first housing.

As noted above, spring assisted slide phones are known in the art. If the spring assist technology used in those phones is applied to a landscape slide mechanism without any specification changes, mechanism elements, mainly springs, would be visible when the product is opened. This would be unsightly and perhaps be prone to damage. This invention can solve this problem.

This invention can be used in a long stroke sliding mechanism for a slide type electronic device. Most previous sliding mechanisms have the drawback of having an ugly mechanism visible when the product is open. The invention can comprise the design of a mechanism which takes up very little space in its sliding direction. Due to this design, the device can have a relatively long opening stroke, whilst still staying hidden inside the visible parts of the product.

An advantage can be having a hidden mechanism which allows for a much more attractive product. It also improves reliability; as the parts are not accessible to abuse. A novel feature includes the design of the hidden mechanism. It is very simple and allows a long opening stroke. The invention overcomes the need in landscape (or horizontal) slide mechanisms. This invention allows a very short guide rails area without visual defect, meaning that no spring module comes out when the product is in its open position.

Advantages can include a stroke of up to 30 mm with 16.5 mm guide rail length in one embodiment. A 50:50 buckling ratio can be achieved. The buckling point can be offset from a perpendicular axis (versus the axis of travel). Slide force can be adjustable by fine-tuning the spring force. A spring assisted mechanism provides better usability. Spring elements, including the linkage arm, are invisible to the user. Stopper elements are invisible to the user.

The invention can be particularly useful in the future because mobile terminal manufacturers are making utilization of a landscape/horizontal slide form factor more popular.

With the invention an apparatus 10 can be provided comprising a first housing 24; a second housing 26 slidably connected to the first housing along a substantially straight linear path between a first position and a second position; and a biasing system 38 configured to alternatively bias the second housing towards the first position and the second position, wherein the biasing system comprises a linkage 44 connected to the first and second housings and a spring 46 connected between the first housing and the linkage. The first position is a closed, recessed position of the second housing relative to the first housing, and the second position is an open, outwardly extending position of the second housing relative to the first housing. The biasing system 38 is contained between the first and second housings at both the first position and the second position. The linkage comprises a one-piece linkage arm having a middle section 48 forming a pivot location 50, and two arm sections 52, 54 extending from the middle section at an obtuse angle between two arm sections. A first one of the arm sections 52 comprises a longitudinal slot 56 with a portion 60 of the second housing slidably located in the slot. The first housing 24 comprises two stops 64, 66, and wherein a second one of the arm sections 54 is configured to contact a first one the stops 64 when the second housing is at the first position and alternative contact a second one the stops 66 when the second housing is at the second position. The spring 46 comprises a first end connected to the first housing and a second end connected to the linkage proximate the slot. The first end of the spring is spaced from the pivot location 50 of the middle section of the linkage arm with the first housing. The linkage 44 comprises a one-piece linkage arm having a first section 48 pivotably connected to the first housing 24 and a second section 52 slidably and pivotably connected to the second housing 26. The biasing system 38 is configured such that the spring 46 is at a maximum extension or compression when the second housing 26 is not at the first or second positions. The biasing system 38 comprises a buckling point between alternative biasing directions of the biasing system which comprises a longitudinal axis 70 of the spring 46 being angled relative a longitudinal axis 74 of the path between the first and second positions and being angled relative to an axis 72 perpendicular to the longitudinal axis of the path. The apparatus 10 further comprises a display screen 22 and a keypad 40 connected to the first and second housings. A transceiver 14 is located in the first or second housings.

With the invention, an apparatus can be provided comprising a first housing 24; a second housing 26 slidably connected to the first housing along a linear path between a first position and a second position; and a biasing system 38 comprising a linkage arm 44 and a spring 46, wherein the linkage arm comprises a first end pivotably connected to the first housing at a pivotal connection 50 and a second end slidably connected to the second housing 26, wherein the spring 46 comprises a first end connected to the first housing 24 and a second end connected to the linkage arm 44, wherein the first end of the spring is spaced from the pivotal connection 50 of the first end of the linkage arm with the first housing, and wherein the biasing system 38 is configured to bias the second housing towards the first position and alternatively toward the second position. With this embodiment, the first position is a closed, recessed position of the second housing relative to the first housing, and the second position is an open, outwardly extending position of the second housing relative to the first housing. The biasing system 38 is contained between the first and second housings 24, 26 at both the first position and the second position. The linkage arm 44 has a middle section 48 at the pivotal connection 50, and two arm sections 52, 54 extending from the middle section at an obtuse angle between two arm sections. A first one of the arm sections 52 comprises a longitudinal slot 56 with a portion of the second housing 26 slidably and pivotably located in the slot 56. With this embodiment, the first end of the spring is spaced from the pivotal connection 50 of the linkage arm 44 with the first housing, wherein the biasing system 38 is configured such that the spring 46 is at a maximum extension or compression when the second housing 26 is not at the first or second positions, wherein the biasing system 38 comprises a buckling point between alternative biasing directions of the biasing system which comprises a longitudinal axis 70 of the spring 46 being angled relative a longitudinal axis 74 of the path between the first and second positions and being angled relative to an axis 72 perpendicular to the longitudinal axis 74 of the path, wherein the apparatus further comprises a display screen 22 and a keypad 40 connected to the first and second housings, and a transceiver 14 located in the first or second housings.

Figure 11:
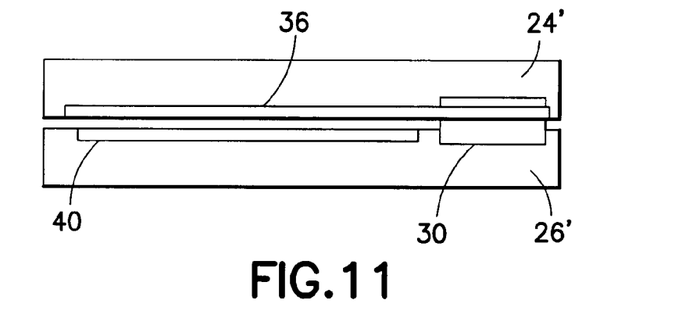
FIG. 11 is a schematic diagram illustrating another embodiment in a closed configuration.
Figure 12:
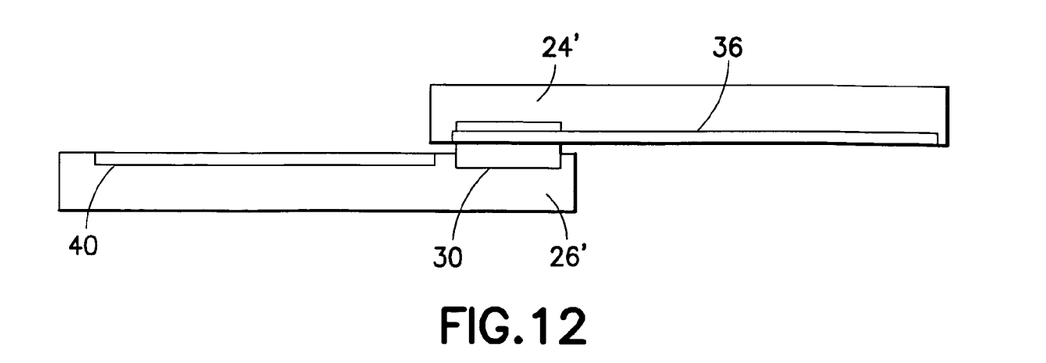
FIG. 12 is a schematic diagram illustrating the embodiment shown in FIG. 11 in an open configuration.

For the embodiment shown in FIGS. 1-8, the guide rails 30 were described as being on a portion of the first housing 24, and the portion 36 was described as being part of the second housing 26. However, as illustrated by the embodiment shown in FIGS. 11 and 12, the guide rails 30 could be stationarily attached as part of the housing 26' and the portion 36 could be stationarily attached as part of the housing 24'. In the open configuration shown in FIG. 12, the biasing system 38 would be completely contained between the overlapping portions of the two housings 24', 26' and does not extend from out of the overlapping portions. The spring 46 and linkage arm 44 are kept above the portion forming the guide rails 30 and do not extend past the edges of that portion. However, in alternate embodiments, the linkage arm 44 could slightly extend past the edges of that portion, so long as the linkage arm 44 preferably does not extend past the end edges of the housings 24', 26'.

It should be understood that the foregoing description is only illustrative of the invention. Various alternatives and modifications can be devised by those skilled in the art without departing from the invention. For example, features recited in the various dependent claims could be combined with each other in any suitable combination(s). In addition, features from different embodiments described above could be selectively combined into a new embodiment. Accordingly, the invention is intended to embrace all such alternatives, modifications and variances which fall within the scope of the appended claims.

What is claimed is:

1. An apparatus comprising:
   a first housing;
   a second housing slidably connected to the first housing along a substantially straight linear path between a first position and a second position; and
   a biasing system configured to alternatively bias the second housing towards the first position and the second position, wherein the biasing system comprises a linkage connected to the first and second housings and a spring connected between the first housing and the linkage, where the linkage comprises a one-piece linkage arm having a middle section forming a pivot location, and two arm sections extending from the middle section at an obtuse angle between two arm sections.

2. An apparatus as in claim 1 wherein the first position is a closed, recessed position of the second housing relative to the first housing, and wherein the second position is an open, outwardly extending position of the second housing relative to the first housing.

3. An apparatus as in claim 2 wherein the biasing system is contained between the first and second housings at both the first position and the second position.

4. An apparatus as in claim 1 wherein a first one of the arm sections comprises a longitudinal slot with a portion of the second housing slidably located in the slot.

5. An apparatus as in claim 4 wherein the first housing comprises two stops, and wherein a second one of the arm sections is configured to contact a first one the stops when the second housing is at the first position and contact a second one the stops when the second housing is at the second position.

6. An apparatus as in claim 4 wherein the spring comprises a first end connected to the first housing and a second end connected to the linkage proximate the slot.

7. An apparatus as in claim 6 wherein the first end of the spring is spaced from the pivot location of the middle section of the linkage arm with the first housing.

8. An apparatus as in claim 1 wherein the linkage comprises a one-piece linkage arm having a first section pivotably connected to the first housing and a second section slidably and pivotably connected to the second housing.

9. An apparatus as in claim 1 wherein the biasing system is configured such that the spring is at a maximum extension or compression when the second housing is not at the first or second positions.

10. An apparatus as in claim 9 wherein the biasing system comprises a buckling point between alternative biasing directions of the biasing system which comprises a longitudinal axis of the spring being angled relative a longitudinal axis of the path between the first and second positions and being angled relative to an axis perpendicular to the longitudinal axis of the path.

11. An apparatus as in claim 1 wherein the apparatus further comprises a display screen and a keypad connected to the first and/or second housings.

12. An apparatus as in claim 11 wherein a transceiver located in the first or second housings.

13. An apparatus comprising:
   a first housing;
   a second housing slidably connected to the first housing along a linear path between a first position and a second position; and
   a biasing system comprising a linkage arm and a spring, wherein the linkage arm comprises a first end pivotably connected to the first housing at a pivotal connection and a second end slidably connected to the second housing, wherein the spring comprises a first end connected to the first housing and a second end connected to the linkage arm, wherein the first end of the spring is spaced from the pivotal connection of the first end of the linkage arm with the first housing, and wherein the biasing system is configured to bias the second housing towards the first position and alternatively toward the second position, where the linkage arm has a middle section at the pivotal connection, and two arm sections extending from the middle section at an obtuse angle between two arm sections.

14. An apparatus as in claim 13 wherein the first position is a closed, recessed position of the second housing relative to the first housing, and wherein the second position is an open, outwardly extending position of the second housing relative to the first housing.

15. An apparatus as in claim 14 wherein the biasing system is contained between the first and second housings at both the first position and the second position.

16. An apparatus as in claim 13 wherein a first one of the arm sections comprises a longitudinal slot with a portion of the second housing slidably and pivotably located in the slot.

17. An apparatus as in claim 13 wherein the first end of the spring is spaced from the pivotal connection of the linkage arm with the first housing, wherein the biasing system is configured such that the spring is at a maximum extension or compression when the second housing is not at the first or second positions, wherein the biasing system comprises a buckling point between alternative biasing directions of the biasing system which comprises a longitudinal axis of the spring being angled relative a longitudinal axis of the path between the first and second positions and being angled relative to an axis perpendicular to the longitudinal axis of the path, wherein the apparatus further comprises a display screen and a keypad connected to the first and second housings, and a transceiver located in the first or second housings.

18. A method comprising:
slidably connecting a first housing with a second housing; and
connecting a biasing system to the first and second housings, wherein the biasing system is configured to bias the second housing towards a first position relative to the first housing and alternatively towards a second position relative to the first housing, wherein the biasing system comprises a linkage between the first and second housings and a spring connected between the first housing and the linkage, wherein the linkage comprises a middle section, and two arm sections extending from the middle section at an obtuse angle between two arm sections, where the middle section is pivotably connected to the second housing by a middle pivot, where the first arm comprises a first end pivotably connected to the first housing at a pivotal connection and the second arm comprises a second end slidably connected to the second housing, wherein the spring comprises a first end connected to the first housing and a second end connected to the linkage arm, wherein the first end of the spring is spaced from the pivotal connection of the first end of the linkage arm with the first housing.

\* \* \* \* \*